Patented Mar. 5, 1940

2,192,613

UNITED STATES PATENT OFFICE 2,192,613

PREPARATION OF 3-CHLORO-CYMENE

John E. Livak and Cleo D. Carlson, Midland, Mich., assignors to The Dow Chemical Company, Midland, Mich., a corporation of Michigan No Drawing. Application June 22, 1938, Serial No. 215,217

5 Claims. (Cl. 260—650)

This invention relates to the preparation of 3-chloro-cymene, and in particular concerns a method for the preparation of this compound by the selective reduction of 2-bromo-5-chloro-cymene. The product, 3-chloro-cymene, has the formula

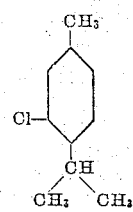

It is useful as an intermediate in the preparation of synthetic thymol and may be also employed in preparing other organic chemicals.

German Patent No. 615,470 teaches that under certain conditions the bromine atom in 2-bromo-5-chloro-cymene may be replaced by hydrogen to produce 3-chloro-cymene. The reaction probably takes place according to the equation:

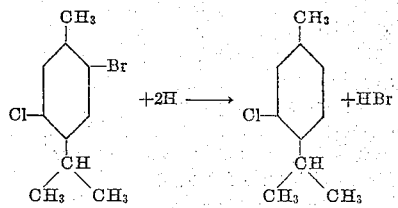

According to the patent, this reaction is carried out by heating 2-bromo-5-chloro-cymene with coppered zinc dust in alcoholic suspension at a temperature of 200° C. for 20 hours.

We have tested the method of said German patent, but have found it to possess a number of disadvantages which render it unsuited to commercial practice. For example, we have found that when the method of the patent is practiced using 3 kilograms or more of 2-bromo-5-chloro-cymene per batch, the yield of 3-chloro-cymene is far below that given in the patent and too low for economic operation. When operating on the scale just mentioned, the zinc dust employed in the reaction tends to adhere to the walls of the autoclave in which the reaction is carried out and must be removed therefrom by dissolving in an acid. Accordingly, recovery of more than a small amount of the unreacted zinc is impossible, and cleaning of the apparatus is difficult and expensive. Furthermore, the reaction is time-consuming in that it requires as much as twenty hours heating at 200° C. to go to completion.

We have now found that the above disadvantages may be avoided and that 3-chloro-cymene may be produced conveniently and in high yields by reacting 2-bromo-5-chloro-cymene with zinc dust in the presence of an alcoholic solution of an alkali metal hydroxide, e. g. sodium or potassium hydroxide. The reaction occurs smoothly and substantially all of the unreacted materials may be readily recovered in a form suitable for re-use. The reaction goes to completion in from three to five hours and the reduction is almost entirely selective with respect to the bromine atom.

When pure 2-bromo-5-chloro-cymene is reacted with zinc and alcoholic alkali according to the invention, the product consists of substantially pure 3-chloro-cymene. However, it is usually more convenient to employ a slightly impure grade of 2-bromo-5-chloro-cymene such as is obtained by the successive bromination and chlorination of cymene in the presence of a catalyst which promotes ring substitution. Such product comprises 2-bromo-5-chloro-cymene and a small amount of 2-chloro-5-bromo-cymene. Upon selective reduction, it gives 3-chloro-cymene and an equally small amount of 2-chloro-cymene. The mixed product so obtained may be separated or it may be employed directly in organic syntheses. For example, it may be hydrolyzed with caustic alkali in the presence of a copper catalyst to obtain a mixture of thymol and carvacrol from which thymol may be separated by fractional crystallization.

The reactants are ordinarily employed in the ratio of approximately 3–5 moles of alkali metal hydroxide in the form of a 5–10 per cent methanol or ethanol solution, and approximately 0.5–2.5 moles of zinc per mole of 2-bromo-5-chloro-cymene, but they may be employed in other proportions if desired. The reaction is preferably carried out by heating the reactants in a closed vessel or autoclave at a temperature of about 175°–225° C. for from 3 to 8 hours, although it may be carried out at reflux temperature and under atmospheric pressure, in which case a longer time will be required for completion of the reaction. Upon completion of the reaction, the alcohol which is employed as a reaction medium is distilled directly from the autoclave, and the residual mixture is diluted with water. Unreacted zinc is filtered from the diluted mixture and dried. The oil layer of the filtrate is drawn off and the water layer is extracted several times with benzene. The benzene extract and oil layer are combined, washed with water, and fractionally distilled under vacuum. Substantially pure 3-chloro-cymene is obtained as a middle fraction distilling at 105–110° C. under 27 millimeters pressure. Small amounts of unreacted 2-bromo-5-chloro-cymene may be recovered from the high-boiling still residue.

The following examples will illustrate a number of ways in which the principle of our invention has been applied, but are not to be construed as limiting the same:

*Example 1*

A mixture of 24.75 lbs. (0.1 lb. mole) of 2-bromo-5-chloro-cymene, 8.2 lbs (0.125 lb. mole) of zinc dust and 16.0 lbs. (0.4 lb. mole) of sodium hydroxide dissolved in 143.0 lbs. of methanol was placed in an iron autoclave provided with means for stirring the charge. The mixture was heated gradually with stirring to 200 C. and maintained at this temperature for 3½ hours. The maximum pressure developed was 600 lbs./sq.in. The autoclave was then cooled and opened and methyl alcohol was distilled off. Approximately 90 per cent of the methyl alcohol employed was recovered. The reaction mixture was next diluted with water to a volume of about 12 gallons, and the excess zinc dust was filtered off, washed, and dried. Approximately 80 per cent of the zinc dust employed was recovered in a form suitable for re-use. The filtrate was allowed to separate into layers, and the upper oil layer containing crude 3-chloro-cymene was drawn off. The lower layer was extracted thoroughly with benzene and the extract was combined with the oil layer. The benzene was removed by distillation and 3-chloro-cymene was obtained by fractional distillation under vacuum. The yield of 3-chloro-cymene was 80.3 per cent of theoretical, based on the 2-bromo-5-chloro-cymene originally employed.

*Example 2*

A mixture of 2475 grams (10 moles) of 2-bromo-5-chloro-cymene, 817 grams (12.5 moles) of zinc dust, and 1600 grams (40 moles) of sodium hydroxide in the form of a 10 per cent methanol solution was placed in a copper-lined autoclave and heated at 200° C. for 5 hours. Upon completion of the reaction, the autoclave and contents were cooled and methanol was distilled off and recovered. The reaction mixture was diluted with water, filtered to separate out the unreacted zinc dust, and allowed to separate into an oil layer and a water layer. The latter was extracted several times with benzene and the extracts were combined with the oil layer of the filtrate. Benzene was removed by distillation and 3-chloro-cymene was obtained by fractional distillation under reduced pressure. The yield of 3-chloro-cymene was 1452.5 grams (86.7 per cent of the theoretical).

Other modes of applying the principle of our invention may be employed instead of those explained, change being made as regards the process herein disclosed, provided the step stated by any of the following claims or the equivalent of such stated step be employed.

We therefore particularly point out and distinctly claim as our invention:

1. In a process for the preparation of 3-chloro-cymene, the step which consists in heating 2-bromo-5-chloro-cymene with zinc in the presence of an alcoholic solution of an alkali-metal hydroxide at a reaction temperature below that at which decomposition takes place.

2. In a process for the preparation of 3-chloro-cymene, the stem which consists in heating 2-bromo-5-chloro-cymene with zinc in the presence of an alcoholic solution of an alkali-metal hydroxide at a temperature between about 175° and about 225° C. and under the autogenous pressure of the mixture.

3. In a process for the preparation of 3-chloro-cymene, the step which consists in heating 2-bromo-5-chloro-cymene with finely divided zinc in the presence of a dilute methanol solution of sodium hydroxide at a reaction temperature below that at which decomposition takes place.

4. In a process for the preparation of 3-chloro-cymene, the step which consists in heating 2-bromo-5-chloro-cymene with finely divided zinc in the presence of a dilute methanol solution of sodium hydroxide at a temperature between about 175° and about 225° C. and under the autogenous pressure of the mixture.

5. In a process for the preparation of 3-chloro-cymene, the step which consists in forming a mixture of 2-bromo-5-chloro-cymene, between about 0.5 and about 2.5 molecular equivalents of finely divided zinc, and between about 3 and about 5 molecular equivalents of sodium hydroxide in the form of a dilute methanol solution, and heating the mixture to a temperature between about 175° and about 225° C. and under the autogenous pressure of the mixture.

JOHN E. LIVAK.
CLEO D. CARLSON.